US009742261B2

(12) United States Patent
Young

(10) Patent No.: US 9,742,261 B2
(45) Date of Patent: Aug. 22, 2017

(54) POWER FACTOR CORRECTION CIRCUIT

(71) Applicant: Eisergy Limited, Dublin (IE)

(72) Inventor: George Young, Dublin (IE)

(73) Assignee: Icergi Limited, Dublin (IE)

( * ) Notice: Subject to any disclaimer, the term of this patent is extended or adjusted under 35 U.S.C. 154(b) by 0 days.

(21) Appl. No.: 14/777,141

(22) PCT Filed: Mar. 14, 2014

(86) PCT No.: PCT/EP2014/055214
§ 371 (c)(1),
(2) Date: Sep. 15, 2015

(87) PCT Pub. No.: WO2014/140351
PCT Pub. Date: Sep. 18, 2014

(65) Prior Publication Data
US 2016/0036318 A1 Feb. 4, 2016

(30) Foreign Application Priority Data

Mar. 15, 2013 (GB) .................................. 1304709.7

(51) Int. Cl.
H02M 1/42 (2007.01)
H02M 1/34 (2007.01)
H02M 7/06 (2006.01)

(52) U.S. Cl.
CPC ............... *H02M 1/34* (2013.01); *H02M 1/42* (2013.01); *H02M 1/4225* (2013.01); *H02M 7/06* (2013.01); *H02M 2001/346* (2013.01); *Y02B 70/126* (2013.01); *Y02B 70/1491* (2013.01)

(58) Field of Classification Search
None
See application file for complete search history.

(56) References Cited

U.S. PATENT DOCUMENTS

| 3,906,337 | A | 9/1975 | Depenbrock |
| 5,047,912 | A | 9/1991 | Pelly |
| 6,691,143 | B2 * | 2/2004 | Blaker ............... G06F 7/728 |
| | | | 708/491 |
| 7,508,185 | B2 | 3/2009 | Lin |
| 9,059,636 | B2 * | 6/2015 | Lehn ............... H02M 3/335 |
| 9,099,232 | B2 * | 8/2015 | Chandrasekaran ... H02M 3/155 |
| 9,106,130 | B2 * | 8/2015 | Chandrasekaran ... H02M 3/156 |
| 9,240,712 | B2 * | 1/2016 | Chandrasekaran . H02M 1/4225 |
| 2006/0012348 | A1 * | 1/2006 | Zhao ............... H02M 3/155 |
| | | | 323/259 |

(Continued)

OTHER PUBLICATIONS

Li, et al., "Passive lossless snubber with minimum voltage and current stress for boost PFS", Sep. 20, 2009, pp. 940-947, Publisher: Energy Conversion Congress and Exposition, 2009.

(Continued)

*Primary Examiner* — Timothy J Dole
*Assistant Examiner* — Sisay G Tiku
(74) *Attorney, Agent, or Firm* — Charles A. Lemaire; Jonathan M. Rixen; Lemaire Patent Law Firm, P.L.L.C.

(57) ABSTRACT

The present application relates to AC power supplies and in particular to power factor correction circuits in AC-DC converters. The application provides an active power factor correction circuit in which zero voltage switching is inherently achieved using a passive snubbing approach employing a saturable transformer.

20 Claims, 12 Drawing Sheets

(56) References Cited

U.S. PATENT DOCUMENTS

| | | | | |
|---|---|---|---|---|
| 2008/0031016 | A1* | 2/2008 | Lin | H02M 1/34 |
| | | | | 363/21.03 |
| 2012/0014150 | A1* | 1/2012 | Domb | H02M 1/4208 |
| | | | | 363/89 |
| 2014/0016370 | A1* | 1/2014 | Chandrasekaran | H01F 3/14 |
| | | | | 363/21.12 |
| 2015/0263605 | A1* | 9/2015 | Alam | H02M 1/4241 |
| | | | | 363/21.02 |

OTHER PUBLICATIONS

"PCT Search Report/Written Opinion for related PCT/EP2014/055214 application, dated Nov. 12, 2014, 17 pages".

\* cited by examiner

Figure 2  (a)  (b)  (c)  PRIOR ART

POWER FACTOR CORRECTION CIRCUIT

FIELD OF THE APPLICATION

The present application relates to AC power supplies and in particular to methods of providing for power factor correction in an AC-DC converter.

BACKGROUND

Power factor correction (PFC) is frequently required in the power supplies of electronic equipment fed from AC lines, and likewise in line-derived lighting systems. A power factor correction circuit changes the waveform of current drawn by the power supply to improve the power factor. The purpose is to attempt to make a power supply appear as a purely resistive load, representing a power factor of 1. In practise, it is extremely difficult to achieve a unity power factor. Nonetheless, a power factor above 0.9 or 0.95 is routinely demanded by systems integrators, standards agencies and legislation.

An example of a typical configuration for a switching mains power supply, as illustrated in FIG. 1, accepts a mains supply voltage 2 as an input to a power factor correction circuit 6. The power factor correction circuit may be preceded by an input circuit 4. This input circuit 4 may provide protection features, such as surge protectors and fuses may be provided between the mains supply and the Power Factor Correction Circuit. Similarly, the input circuit may provide filtering for EMI. A user operable switch (not shown) may also be provided allowing a user to switch the mains supply on or off as desired. The output from the PFC circuit is a quasi-DC voltage. The output is a quasi DC voltage as it comprises a DC component with a ripple. The quasi-DC voltage output from the PFC circuit is typically between 400 and 420 volts. A DC-DC converter 10 employing a transformer 12 (where isolation is required) may be provided to convert this relatively high voltage to a working voltage for the subsequent electronic equipment 14 being powered by the power supply. Whilst a high power factor is generally required, equally the power supply designer must meet other requirements including for example, cost, efficiency, safety and EMI performance.

There are two general approaches in the Prior art to power factor correction. In the first approach, the incoming AC mains supply is rectified and the Power Factor circuit correction works upon the rectified AC mains typically as a switching converter having a boost topology. An alternative approach, as shown in FIG. 2, integrates the rectification function and the switching converter function.

In this alternative approach, an AC-side inductor 20 is provided with an AC-side switch 22 coupled to a diode bridge 24, 26, 28, 30 as outlined in Pelly U.S. Pat. No. 5,047,912. The AC-side switch has historically consisted of parallel connected thyristors 34, 36 (for example as disclosed in Depenbrock U.S. Pat. No. 3,906,337 and as shown in FIG. 2(b)) and more recently series-connected MOSFET elements 38, 40 as provided for (as shown in FIG. 2C) or reverse-blocking IGBTs. The inductor 20 is periodically charged by turning "on" switch 22 for a small time period. When the switch 22 is turned off, the inductor current continues to flow. The current flow is no longer through the switch 22 but rather through one of the diode pair combinations 24, 30 or 26, 28 depending on the polarity of the half mains cycle of the input voltage, to a capacitor 32 (referenced as 8 in FIG. 1). When series-connected MOSFET devices are employed, both devices can be ON during the relevant switching period, thus reducing losses that would otherwise arise from current flowing through the body-diode of one of the devices.

The normal goal with power factor correction—i.e. obtaining a high power factor—may be seen generally to translate into having input current proportional to input voltage. As the input voltage is nominally sinusoidal, any control scheme employed seeks to ensure that the current is proportional to the instantaneous input voltage, with the proportionality factor determined by a voltage error loop controlling the voltage on capacitor 32. It will be appreciated that the value of current may be set arbitrarily by the duration of the switching of switch 22, and that continuous-mode operation may generally be established after a number of switching cycles. Although, continuous mode operation generally requires fast recovery diodes and so a circuit designer may prefer to operate in discontinuous mode. The input current 36, as shown in FIG. 3 essentially corresponds to the inductor current waveform. This representation illustrates, in the expanded section, the current variation 34 expected with a fixed-frequency continuous-mode control approach. Equally, it will be recognised that discontinuous current conditions and/or variable frequency operation may be used as required, and that operating mode may change across the line cycle.

It is generally recognised that the current ripple needs to be minimised in the first instance, and to be filtered in order to avoid potentially interfering signals being put on the line. Indeed a rigorous compliance regimen prevalent in most countries specifies low levels of permissible noise. Both these aspects usually motivate operation at higher frequencies, where the inductor value may be less and as a result the inductor physically smaller. Additionally, when higher frequencies are used for switching, the size of filtering components 4 may also be reduced materially in size.

Unfortunately, whilst operation at higher frequencies is desirable, losses generally increase with frequency. These increased losses are generally associated with switching losses. These losses may include those due to reverse recovery of the "fast" switching diode (24 or 28 in FIG. 2). One solution to this particular loss is to employ a wide-bandgap type of diode, for example a Silicon Carbide diode. Nonetheless, losses can remain quite significant from parasitic capacitances. For example in a converter designed for operation at several hundred watts, the losses may aggregate to a value equivalent to a linear capacitor of perhaps 150 pF. If this is charged to 400V on each occasion when the switch is turned on, the energy loss will approximate the stored energy or $0.5\ CV^2$. Under the conditions mentioned this will amount to 12 µJ per switching cycle, or 1.2 W dissipation at 100 kHz and proportionally higher at higher frequencies. The overlap of voltage and current waveforms may be amenable to some snubbing approaches, but is also a material contributor to losses with this contribution also likely to increase with increasing frequency. Thus whilst circuit designers generally wish to use higher frequencies for reduced component sizes, the losses associated with operation at higher frequencies act as a strong disincentive to do so.

SUMMARY

The present application provides a circuit and method by which the size of the magnetics may be reduced. This is achieved by reducing switching losses so that higher switching frequencies may be employed reducing the size of magnetic components.

More particularly, the present application provides a power factor correction circuit for a power supply in accordance with claim 1.

Advantageous features are set forth in the dependent claims.

A first embodiment provides a power factor correction circuit for a power supply. The power factor correction circuit is of the type comprising a first inductor, a first capacitor, a first switch and a rectifying bridge. Suitably, the first inductor, first capacitor, first switch and rectifying bridge are arranged in a boost topology. The arrangement may also be used with other topologies including for example isolated and non-isolated Flyback topologies. In the power factor correction circuit, a snubber is connected to one side of the first switch. The snubber comprises a transformer, with one side of a first winding connected to the first switch. A second winding of the transformer is connected in series with the first inductor. The transformer is a saturable transformer meaning that the transformer saturates under normal operating conditions. In contrast, it is undesirable generally to have inductors in switching power supplies saturate and are selected accordingly. One method of preventing saturation is to include an air gap. In contrast, a designer seeking to design a saturable transformer would omit such an air gap.

The snubber may further comprise a second capacitor in series with the first winding. In one arrangement, the snubber is connected at a first end to a node common to the first switch and the rectifying bridge. In this arrangement, the snubber may be connected at a second end to another node of the rectifying bridge.

The rectifying bridge may be provided in different forms. In a first form, the rectifying bridge comprises four diodes. In a second form, the rectifying bridge comprises two switches and two diodes. In this second form, one of the switches of the rectifying bridge is the first switch. A controller is suitably provided to control the operation of the power factor correction circuit. The power factor correction circuit is preferably operated in a continuous conduction mode. The controller is suitably configured to control the operation of the first switch to ensure the operation of the power factor correction circuit in a continuous conduction mode.

It will be appreciated that under certain load conditions, a power factor correction circuit may not be able to operate in continuous conduction mode. If the controller detects a condition where the power factor correction circuit is not able to operate in continuous conduction mode, the controller may limit switching of the switch for one or more intervals.

The interval may comprise a full mains cycle. Alternatively, the interval may comprise a period at the start and the end of each half mains cycle. In another variation, the intervals are selected to occur during a half mains cycle such that the controller operates in a burst mode.

Other features and advantages of the present application will become apparent from the following description of the application which refers to the accompanying drawings.

DESCRIPTION OF DRAWINGS

Accordingly the present application will now be described with reference to the following drawings in which.

DETAILED DESCRIPTION

Figure 1:
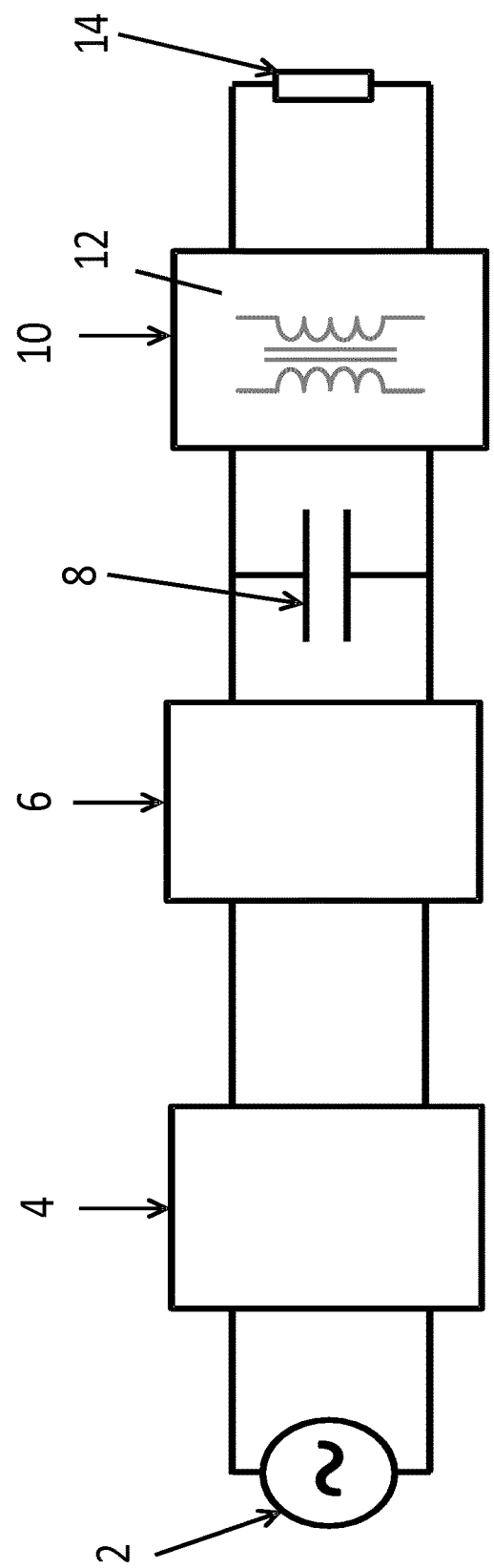
FIG. 1 discloses a conventional arrangement of a mains power supply with PFC.
Figure 2:
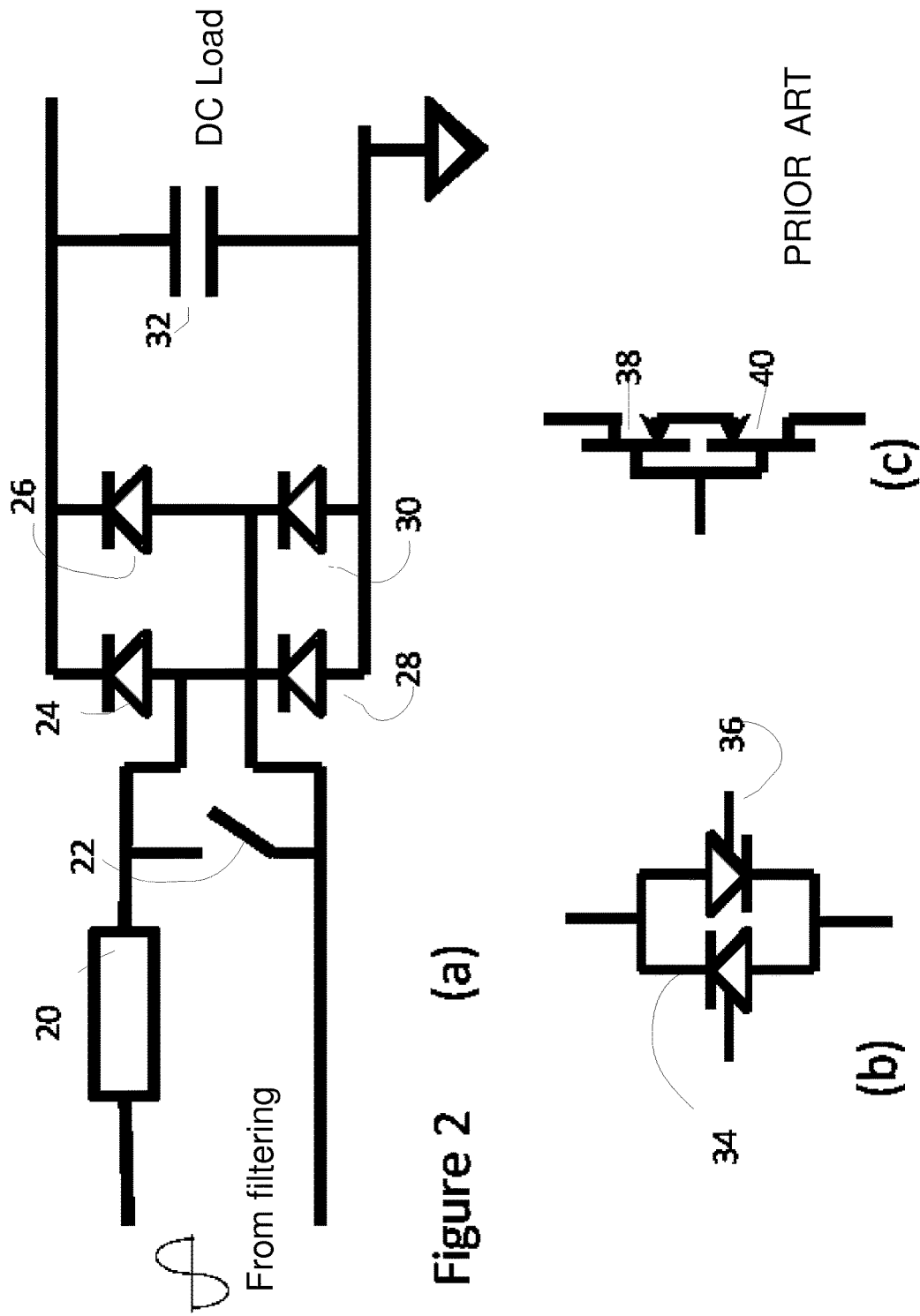
FIG. 2 discloses a circuit using a known approach to PFC in a power supply of the type shown in FIG. 1.
Figure 3:
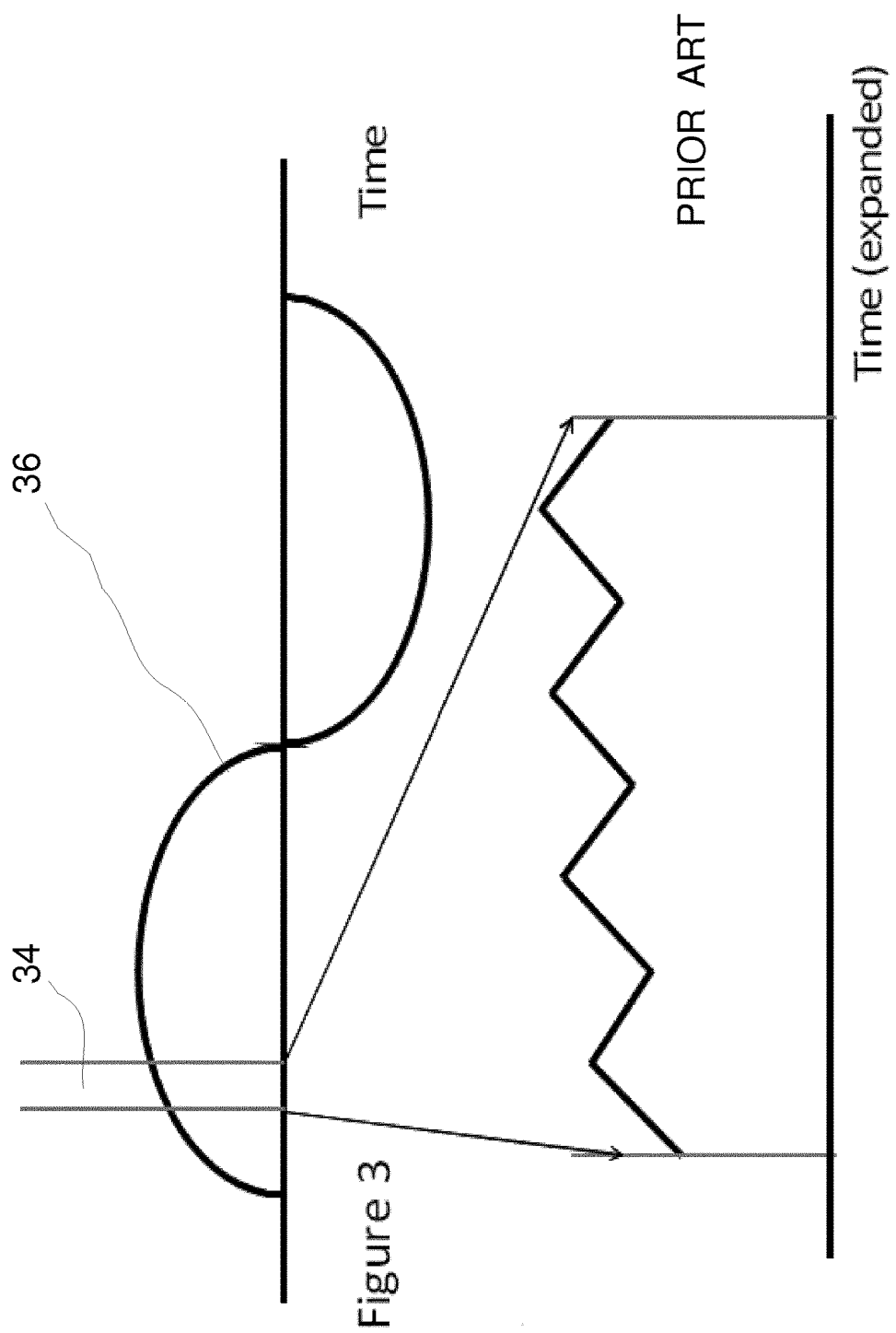
FIG. 3 illustrates the waveforms associated with the circuit of FIG. 2.
Figure 4:
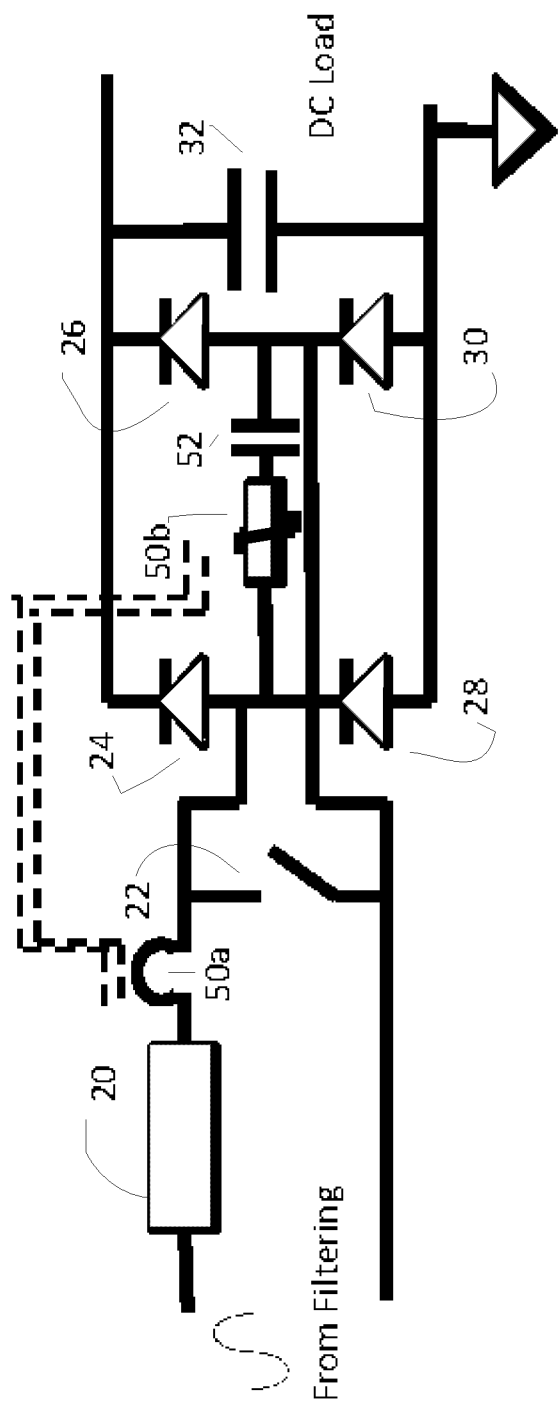
FIG. 4 is a circuit according to a first aspect of the present application.

The present application provides a power factor correction circuit for use in a switching power supply. The switching power supply may be of the type generally shown in FIG. 1, and is suitably an AC mains fed power supply. The power factor correction circuit provides a DC output to a further stage in the power supply. The power factor correction circuit, as shown in the exemplary arrangement of FIG. 4, provides an operating condition of reduced voltage or zero-voltage switching through the use of a saturable reactor snubber. Continuous-mode operation is desirable in the context of this approach to allow zero-voltage switching and also to minimise inductor volume and filtering needs at high frequency.

More particularly, as illustrated in the first exemplary embodiment of FIG. 4, a power factor correction circuit is provided which combines an inductor 20, a switch 22, a rectifying bridge 24, 26, 28 and 30 and a capacitor 32 to provide a switching converter. The general topology of the switching converter is that of a boost converter which takes as mains input, which may have been filtered or otherwise conditioned, and provides a quasi-DC output in the form of DC voltage with a ripple.

A saturable reactor snubber is provided in the circuit to facilitate reduced voltage or zero-voltage switching of the switch 22. A first end of the snubber is connected to a node on one side of switch 22 which is common to an input node of the rectifying bridge. The opposite end of the snubber is connected to a node on the opposite side of switch 22 and to the other input node of the rectifying bridge. The output nodes from the rectifying bridge are connected to capacitor 32. A second winding 50a of the transformer is provided in series with the inductor 22. The transformer core and windings are selected to be such so as to ensure the core saturates under normal current conditions as will be explained in greater detail below.

The snubber is particularly effectively in a circuit where the switch 22 is an AC switch (bidirectional) as it inherently operates in a bidirectional fashion in the circuit configuration as shown. The winding 50a may be placed at either end of the inductor 20 so as to be in series with it. However, it may generally be more convenient to place the inductor as shown between the inductor and the switch 22. This reduces any risk of coupling of switching noise to the input based on parasitic capacitive and magnetic elements.

The operation of the circuit may be considered for a condition where the AC line polarity is such that the input terminal connected to the inductor 20 is positive with respect to the other input terminal.

Figure 5:
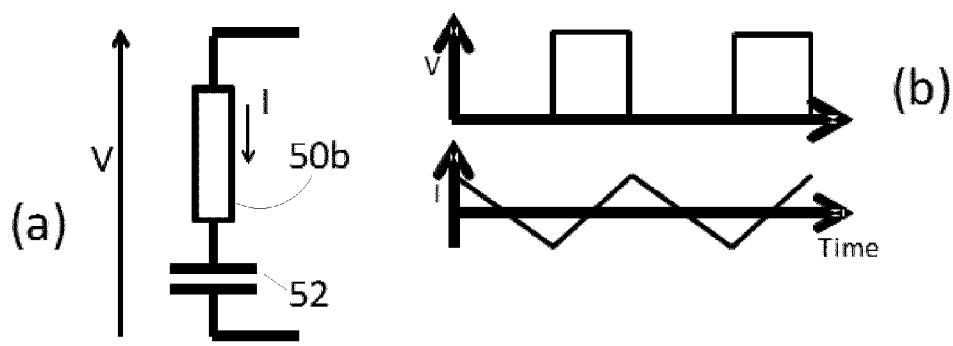
FIG. 5 illustrates the mode of operation of a part of the circuit of FIG. 4.
Figure 6:
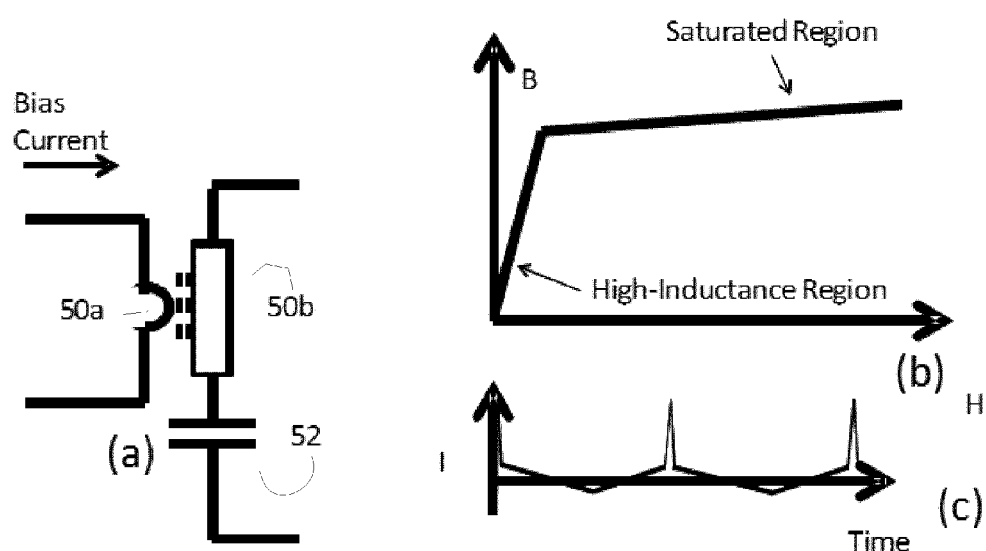
FIG. 6 further illustrates the mode of operation of the part of the circuit of FIG. 4.
Figure 7:
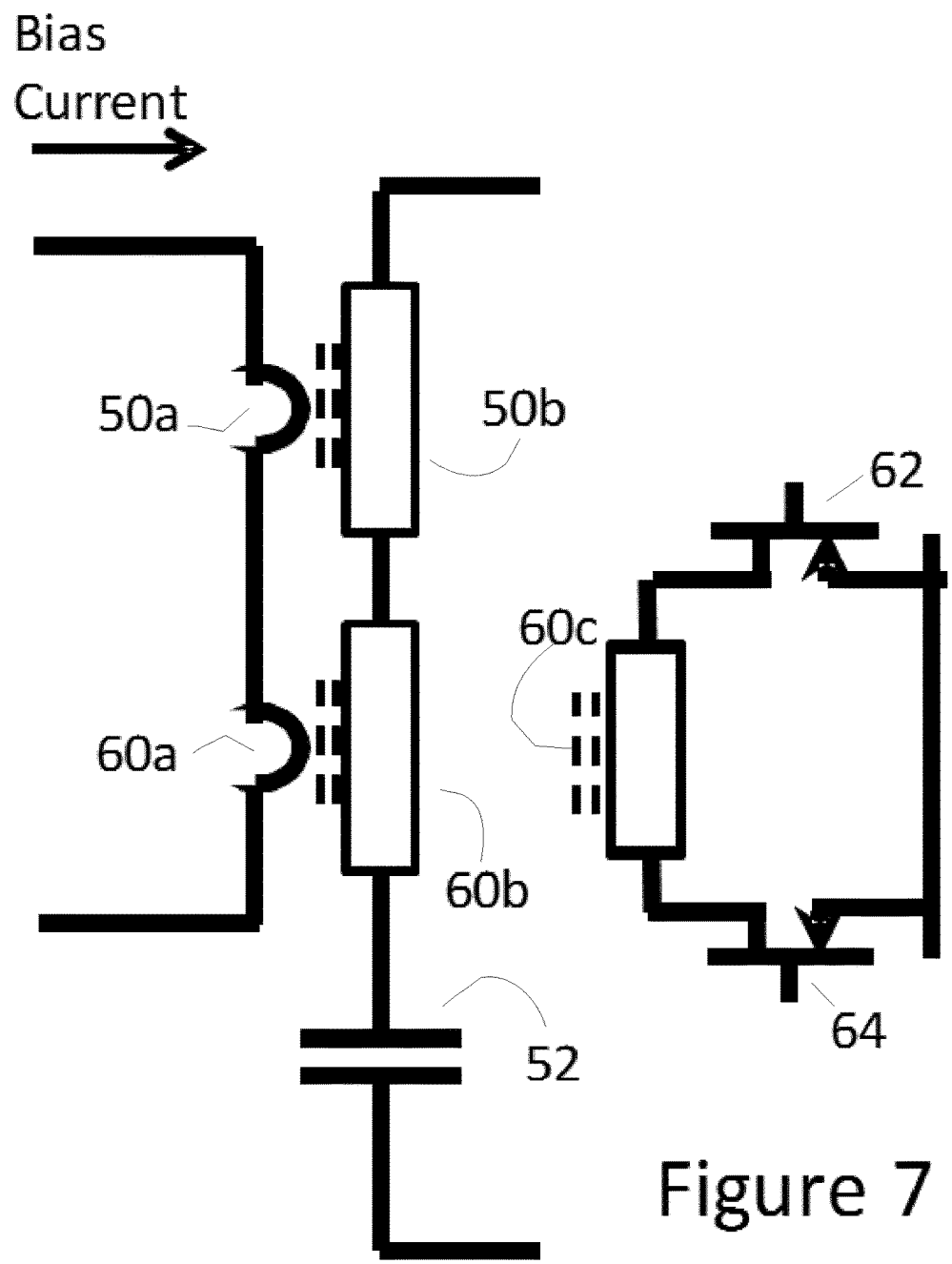
FIG. 7 is a circuit according to a further aspect of the present application.

On this basis the transformer element 50, assembled on a saturable core, operates as in FIG. 5 and FIG. 6.

The mode of operation of the snubber may be considered initially as that of an LC branch as shown in FIG. 5(a) placed between the switching node and a "quiet" point in the circuit, which in the exemplary circuit is the node common between diodes 26 and 30. A quiet point may be taken to be a node in the circuit where the voltage changes relatively slowly compared to the switching frequency. FIG. 5(b) shows the voltage and current waveforms associated with such a branch under steady-state operating conditions. It will be appreciated that if a sufficient redirection current, so as to effect zero voltage switching, is to come from a linear inductor/capacitor connection as shown in FIG. 5(a), then the RMS current values required would be very high negating much of the efficiency benefit potentially available. Accordingly rather than rely solely upon the inductance of winding 50b and the capacitor 52 the inductor 50b, as shown in FIG. 6(a), is provided as a winding on a transformer. The transformer core is a saturable magnetic element.

It will be recognised that application of a bias current in winding 50a will cause current to flow in a manner such as to reduce the voltage across the capacitor 52. As inductor current flow is continuous this voltage continues to reduce even during the diode conduction phase. The capacitor voltage thus gives rise to a condition where the volt-seconds across the inductor can only be balanced by the transformer 50 saturating. Saturation will happen at the end of the diode conduction phase. FIG. 6(b) shows the typical BH characteristic of the transformer material, with a low value of incremental inductance seen in consequence in the saturated region. This action then gives an asymmetric redirection current with a low RMS current value, as shown in FIG. 6(c). The saturable transformer may also be designed such that the flux swing is relatively small of the order of +/−50 mT in a range just below the saturation level, corresponding to acceptable core loss for available magnetic materials. It will be noted that as the primary action relates to the transformer action charging capacitor 52, magnetic characteristics of transformer 50 can be chosen quite widely, as magnetising current in the high-inductance region is likely to the much lower than the current associated with transformer action in charge/discharge of capacitor 52.

It will be appreciated that the design and selection of the various components and in particular that of the saturable inductive element 50 will vary dependent on circuit requirements. However, an exemplary design basis for the saturable inductive element may have regard to the following aspects:

The turns count should be such that the applied volt-seconds cause an appropriate flux swing. "Appropriate" here may be taken to mean a flux swing that is compatible with acceptable loss density figures for the magnetic material as used in the saturable inductor, typically less than 1000 KW/m$^3$ for an element using natural convection for cooling. This flux swing should be sufficient such that the transition region between linear and saturated operating conditions is traversed relatively rapidly so that a pulse with the requisite aspect ratio or "sharpness" is generated. It will be recognised that the pulse amplitude should be such to cause current reversal. Equally, it is desirable that the width of the pulse be narrow (implying fast current rise and fall times) such that losses due to currents in the auxiliary circuit are minimised.

The turns ratio of the bias current winding to the main winding should be selected such that the current pulse has adequate amplitude to effect current reversal and thus zero-voltage switching on the device that is about to turn on. The average capacitor voltage is substantially constant over many cycles, and thus the net current into the capacitor across a cycle is zero. The current-time product (charge increase) into the capacitor (the bias current divided by the transformer ratio, neglecting magnetising current effects) should thus equal the net current-time product (charge decrease) from the capacitor (i.e. the current reversal pulse).

The aspect ratio characteristics of the pulse of current (with the principal characteristic here being the slope of current rise and fall, linked to the width of the pulse) may be determined by the characteristics of the magnetic material as this transitions from linear to saturated mode, and also by the incremental inductance when the material is considered saturated. In the case of an ideal material, this would correspond to a $\mu_r$ value of 1, but in practice a small multiple of this value may need to be accommodated in the design procedure.

It will be recognised that the redirection current will be largely proportional to the magnitude of the current from the inductor, which in turns affects the voltage swing on the capacitor. In a power-factor correction deployment, however, there are other aspects such as the voltage swing required from the redirection current, and to this end an element of controllability of the redirection current amplitude independent of the "automatic" aspect that naturally results from the design as outlined.

A means to achieve this effect is as shown in FIG. 6(d) where one or more cores can be connected with each winding in series with the corresponding winding of core 50, and with an isolated "shorting" connected as shown, where ground-referenced drives may be used to effectively switch in and switch out various cores. Thus in FIG. 6(d) an additional core 60 is shown, with winding 60c capable of being shorted by simultaneous drive of the two switches 62 and 64. This ability to switch in cores as shown, in phase or in antiphase, may be employed to give control of the redirection current amplitude.

Figure 8:
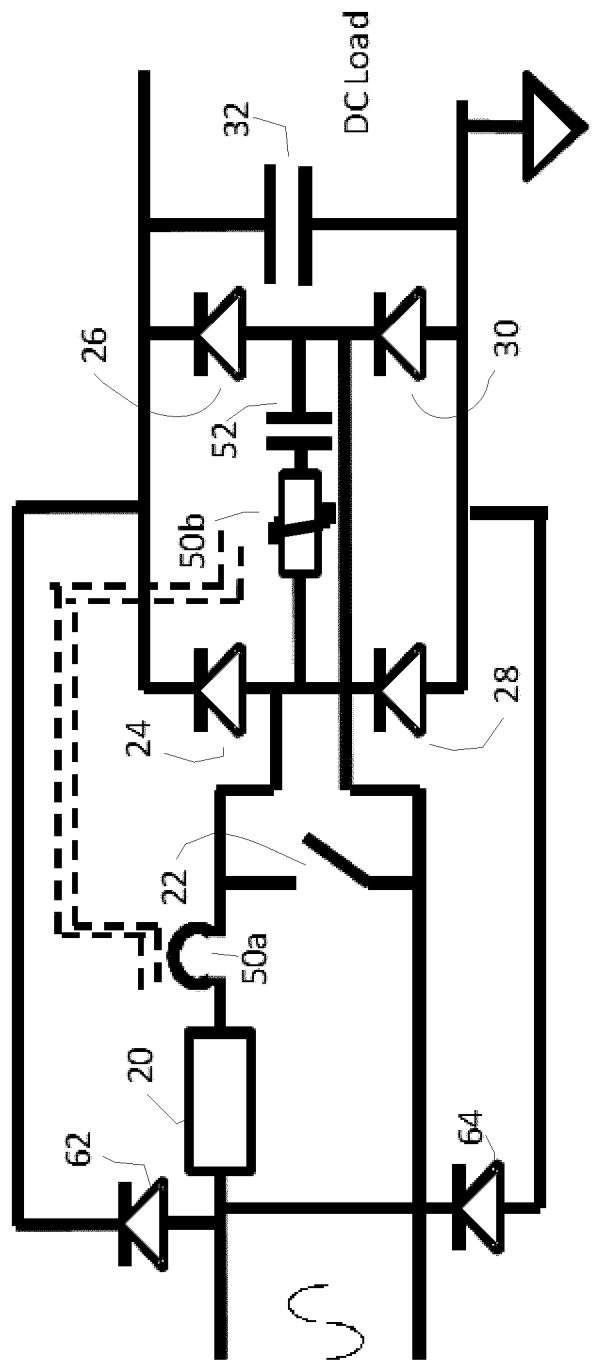
FIG. 8 is a modified form of FIG. 3 with inrush current diodes.

It will be recognised that in a practical circuit implementation it may be necessary to provide for large inrush currents to flow into capacitor 32 on start-up or in the event of a surge condition on the line. This may be provided for by including inrush diodes 62, 64 in the circuit of FIG. 4 as shown in FIG. 8. Typically the fast rectifier diodes used for switching have lower surge rating than associated with types suitable for managing inrush conditions. Diodes 62, 64, 26, and 30 may all be designed for handling the inrush conditions.

Figure 9A:
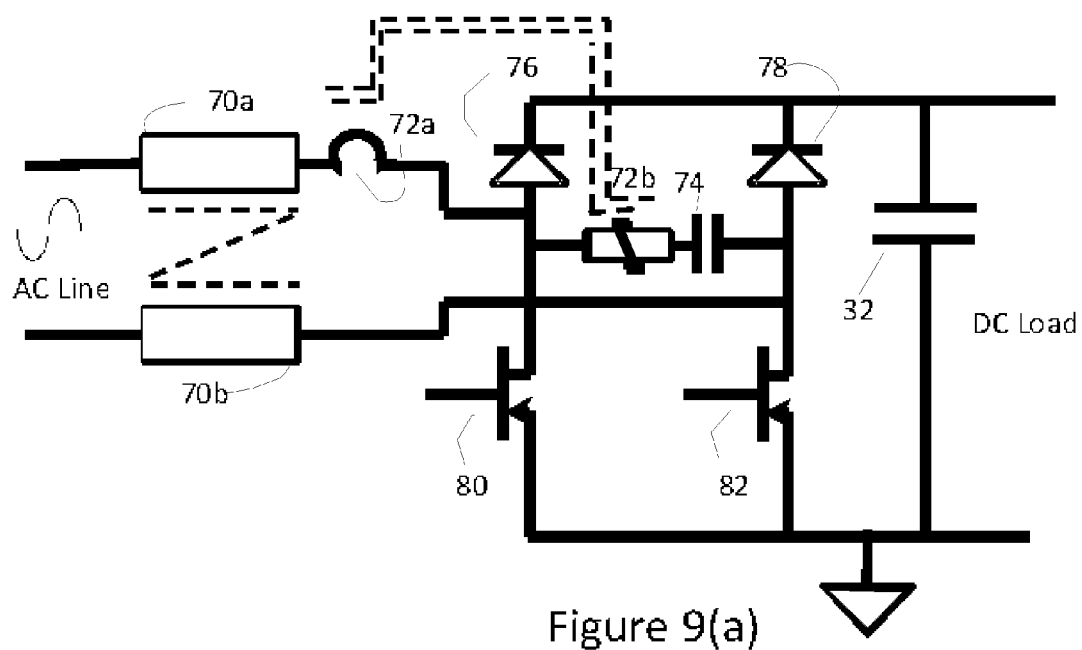
FIG. 9(a) is a circuit according to a further aspect of the present application illustrating how the method may be employed two inductors present on the input.
Figure 9B:
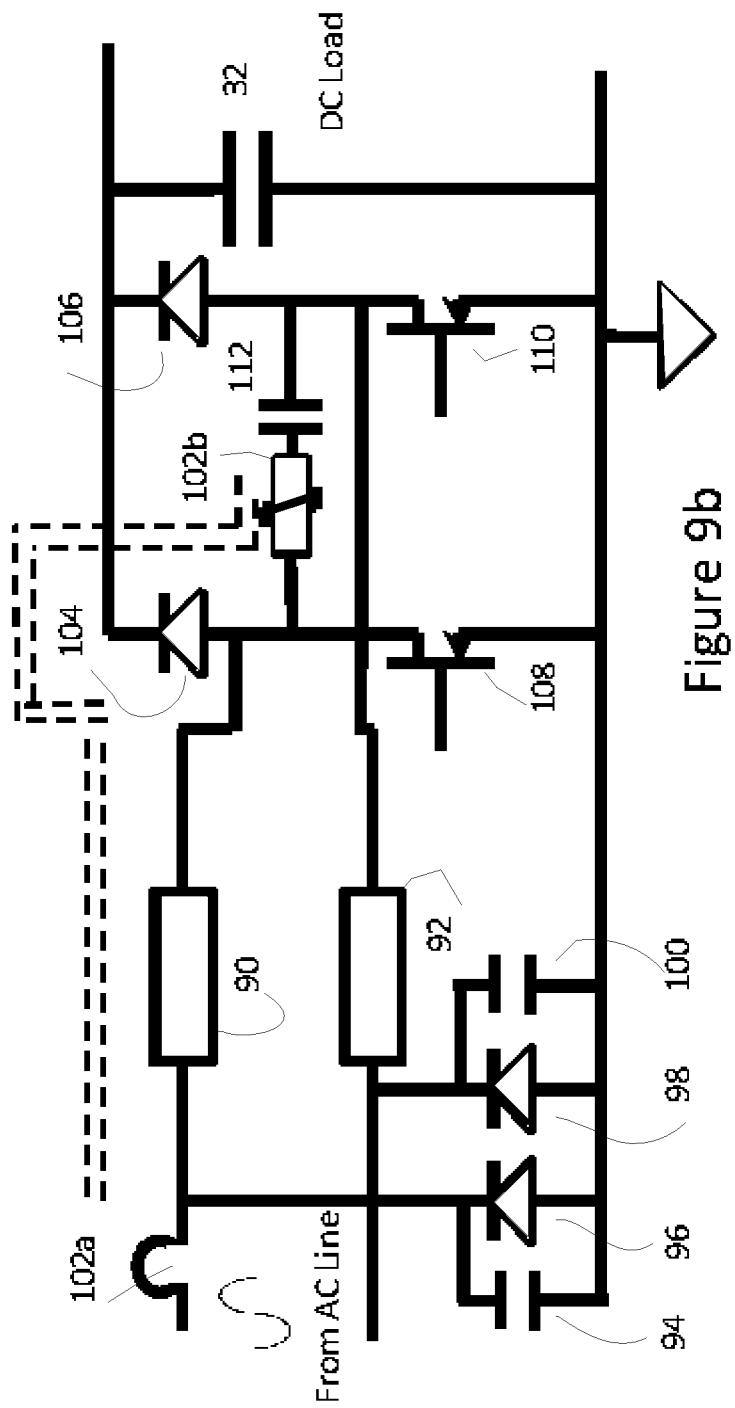
FIG. 9(b) is an alternative arrangement to FIG. 9(a)
Figure 9C:
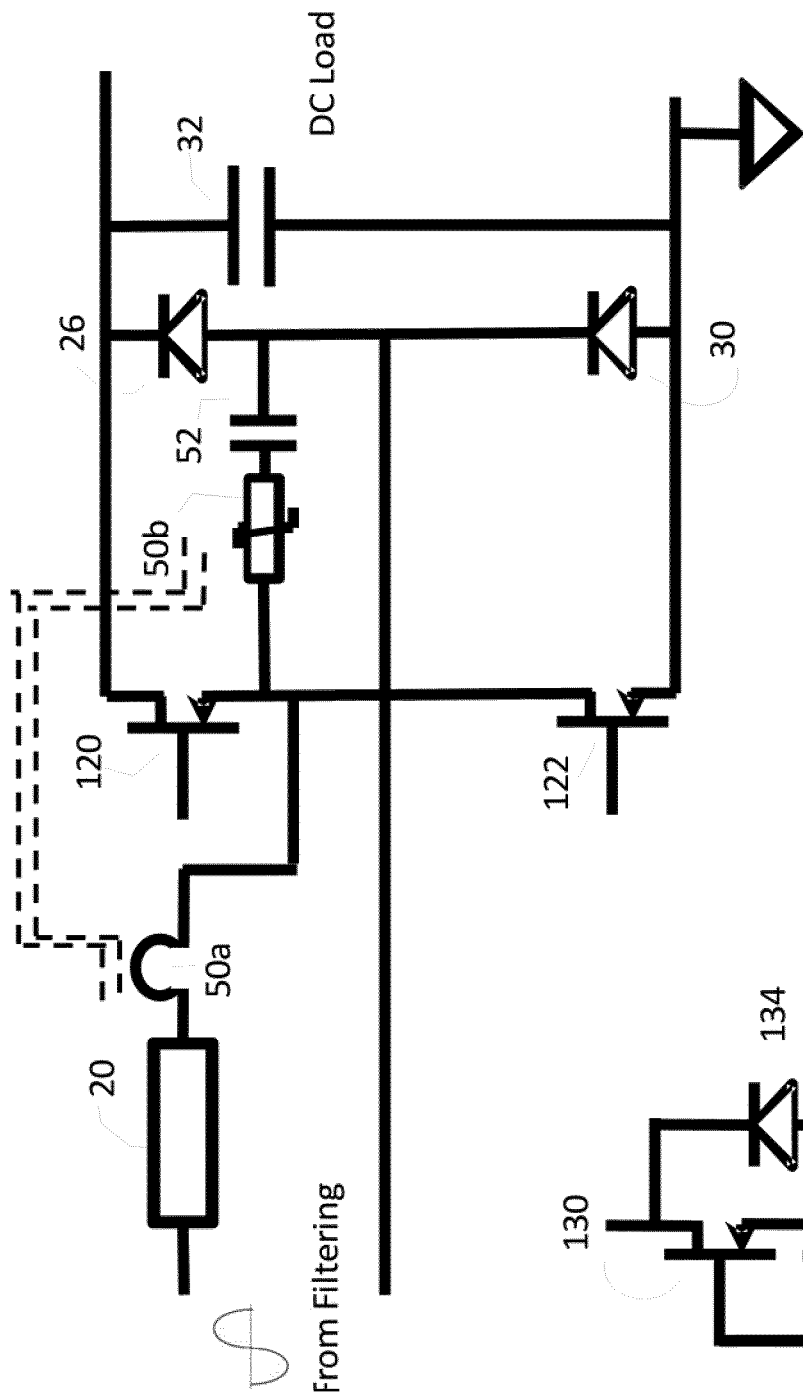
FIG. 9(c) is a modified arrangement of FIG. 3 in which the switch is integrated within the functionality of the rectifier bridge.

It will be recognised that the approach as outlined here is also of value in other power-factor correction schemas and in particular those with two active switches (80,82—104, 108—120,122) such as in FIGS. 9(a), 9(b) and 9(c), or in single-ended power factor correction with a single active switch. In FIG. 9, the inductor 20 of FIG. 4 is provided by inductors 70a and 70b which are suitably coupled. In FIG. 9(a) the redirection approach remains "automatic" in terms of needing no sensing of line polarity. In the circuit of FIG. 9(a), the switching functionality of former switch 22 has been integrated with former diodes 28 and 30 in FIG. 4, to become switches 80 and 82, which may for example be MOSFETs.

In the case of the two-inductor PFC variant of FIG. 9, it may be advantageous to sense (in the winding of the transformer)on the AC line side as shown in FIG. 9(b) as sensing on the other side of the inductors 70a, 70b may result in picking up an indeterminate value of current in the quiet phase, as current division between the diode 96 or 98 and the MOSFET 108 or 110 can be unpredictable.

Figure 9D:
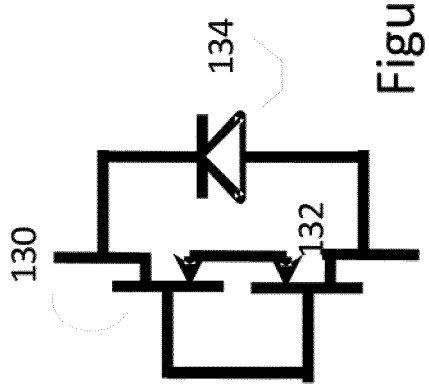
FIG. 9(d) is a switch suitable for use in the circuit of FIG. 9(c)

The "totem pole" approach can also take advantage of the bidirectional redirection capability of the circuit comprising elements 50a/b and 52. Devices 120 and 122 may be GaN types, or other types with minimal issues associated with body diode reverse recovery. In practice it is noted that in the case of silicon devices being used for 120 and 122, these are usually composite devices as shown in FIG. 9(d) with the main MOSFET 130 connected in series with either a Schottky-type diode or else a low-voltage rated MOSFET in the 132 position, and with the combination bypassed by a fast diode 134.

As the snubber operates to facilitate zero voltage switching before the end of the cycle, it is equally appropriate that the switching should therefore occur before the end of the cycle, i.e. the switching converter should be operated in continuous conduction mode or in boundary conduction mode. This also results in reduction or elimination of the common-mode "bounce" effect that could otherwise occur.

Figure 10:
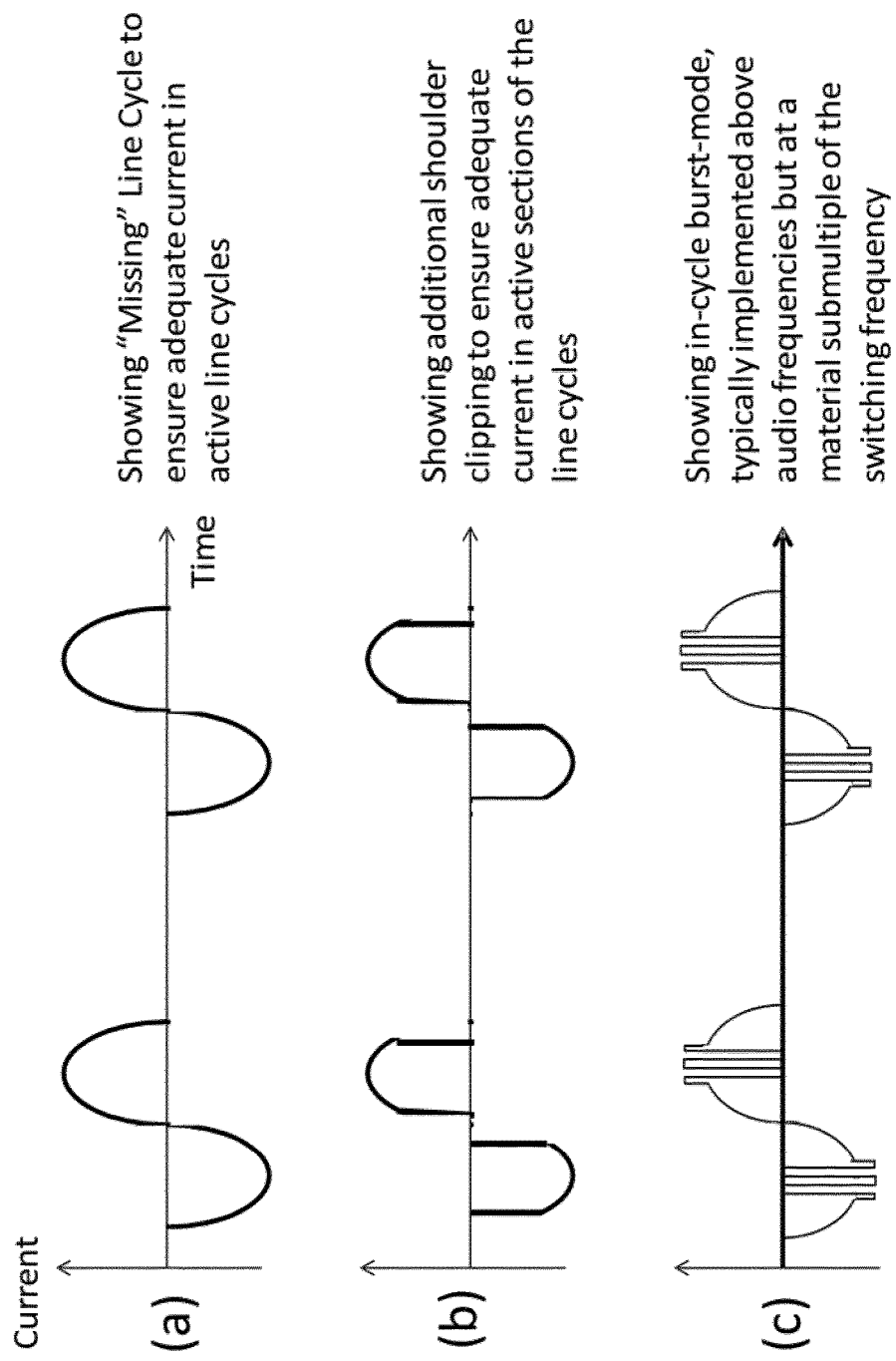
FIG. 10 illustrates method of operation of any of the circuits of the present application to ensure that the circuits remain in a continuous or boundary mode conduction condition.

The operation of the circuitry as shown above largely presupposes continuous-mode operation of the converter elements. Whilst this may inherently be provided by virtue of a minimum load presented to the PFC stage from subsequent stages of the power supply, it is desirable to provide a control scheme which is consistent with this approach under lighter load conditions. To achieve this, the present application provides a controller that operates to try and keeps the PFC stage in continuous mode when switching. The controller does this by trying to ensure a minimum loading condition for each series of pulses. This may be implemented in practice by detecting for a load condition which is insufficient to employ continuous mode conduction and interrupting switching for a period so as to increase the current demanded when switching is resumed. Accordingly, as shown in FIG. 10, the controller may operate so as to prevent switching during certain intervals. In a first mode, the controller may 'skip' switching during cycles so that as to increase the current demanded during non-skipped cycles. Similarly, the controller may employ shoulder clipping, either with cycle skipping or on its own, as the load presented at the start and at the end when the line voltages presented are small may not be sufficient for continuous mode operation. During light load conditions generally, the controller may be configured to operate in a burst-mode. In this burst mode of operation, the modulating (burst) frequency may be selected to be above audio frequencies but at a material sub multiple of the switching frequency. This is easily achievable where the switching frequency selected is above 100 kHz.

At the same time, since obtaining the soft-switching condition is not dependent on any particular"resonant" mode of operation, it is possible to vary the frequency of operation. Thus the controller may vary the switching frequency of the converter within a limited range for example within +/−30% and more preferably within +/−20%. It will be appreciated that the range available may depend on component characteristics. Varying the switching frequency over time offers an advantage in that the noise frequency emission spectrum is effectively spread out which aids compliance with EMI standards.

The control approach within a line cycle and at full-load can be largely compatible with established practices. Current sensing can however represent a challenge given the "polluting" nature of the redirection current. Usage of digital control however typically requires just sampled information. There can be sampling of average values of current obtained using prior-art approaches for current measurement, or a sampling can be undertaken at a particular point on the waveform.

It can be particularly attractive to sample at or just after the peak of current, which is typically at the onset of diode conduction. With knowledge of the input and output voltage and of the system inductance, translation of this peak value to the average value and determination of CCM operation may be undertaken readily. As sampling of current data typically requires that data be available for a short time, saturation of the current sense transformer after this period of measurement is admissible. Although, making provision for catching gross-error conditions that could cause saturation to occur in advance of the measurement instant would be desirable.

Figure 12:
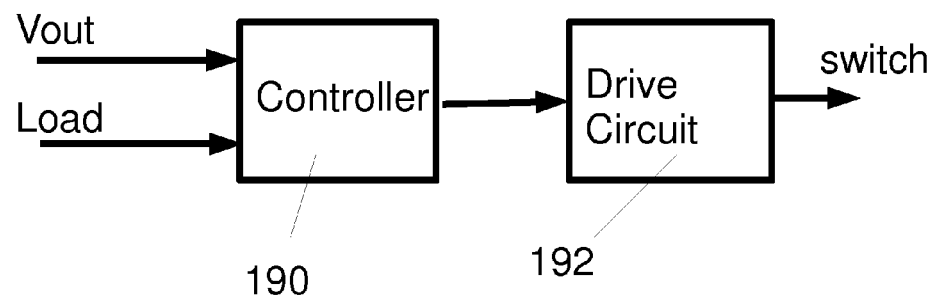
FIG. 12 is a controller for controlling the operation of the PFC arrangements provided herein potentially using the method of operation of FIG. 10, the control algorithm of FIG. 11 or both.
Figure 11:
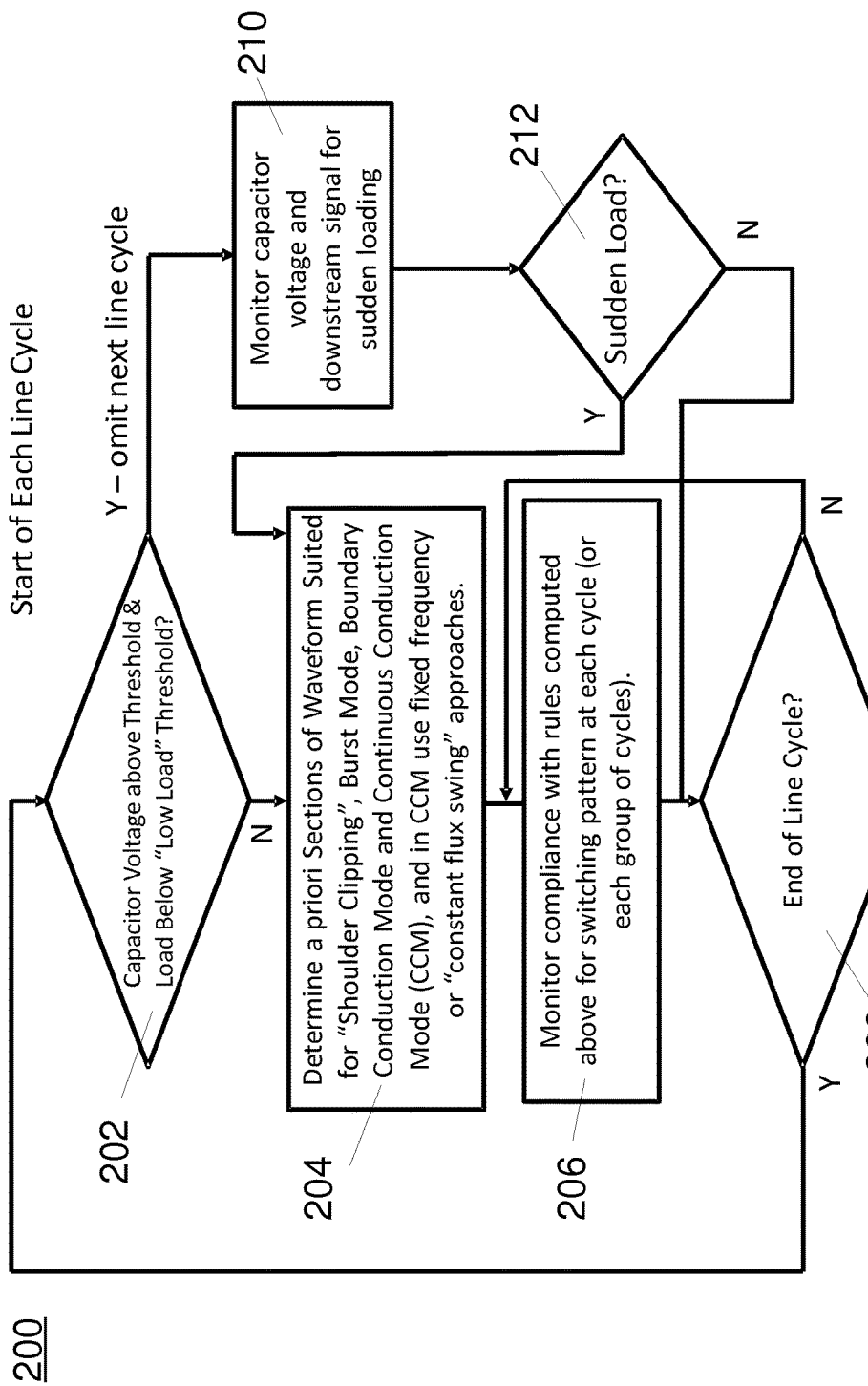
FIG. 11 is a control algorithm for implementing the methods of FIG. 10.

An exemplary controller 190, as shown in FIG. 12, accepts a number of measurements from the PFC stage including the output voltage from the PFC stage, i.e. the voltage across capacitor 32 and a measurement of the load condition which may be provided from a subsequent stage of a switching power supply employing the PFC stage. The controller in turn provides one or more switching signals to operate the switch or switches of the PFC stage, either directly or through appropriate drive circuits 192. The controller operates in accordance with a control algorithm for which an exemplary flow 200 is shown in FIG. 11. The controller seeks to maintain the operation of the converter in continuous mode. In doing so, if the controller detects that continuous mode operation is no longer possible, it halts switching until continuous mode operation becomes possible. This may also be predictive in the sense that the controller may detect that the operating conditions are tending towards a situation in which continuous mode operation will not be possible and the controller may pre-emptively switch mode, for example into burst mode to prevent this. An exemplary method of control for the controller initially detects 202 whether the capacitor voltage is above a minimum threshold and the load is below a minimum load value. If the condition exists the line cycle is skipped, i.e. the controller issues no switching signals. If this condition does not exist, then the algorithm determines 204 whether an appropriate further control (as described above with respect to FIG. 10) is appropriate for the cycle and in particular whether shoulder clipping and to what extent should be employed. This may be determined during a start-up phase where the line voltage or other condition is measured. At the same time, it is determined whether burst mode operation may be appropriate. The controller continues to monitor circuit conditions during the line cycle and may adjust the mode of control (e.g. in or out of burst mode) based on the prevailing conditions measured. For example, if a sudden load is detected 212, the controller may immediately change the mode of operation. This process is repeated for each line cycle. Even where a half-line cycle is skipped, the controller may continue to monitor 210 the circuit conditions for a sudden load and adjust the mode of control upon detecting such a condition.

It will be appreciated that whilst several different embodiments have been described herein, the features of each may be advantageously combined together in a variety of forms to achieve advantage and that variations are possible.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention. It will be understood that whilst particular polarity devices, e.g. PMOS, NMOS, PNP or NPN may be illustrated in the figures, that alternative polarity devices may be employed by appropriate modification of the circuits.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments. Equally, whilst the claims are directed to an isolated gate drive or reset circuit for same, the application is not to be construed as being so limited and extends to a method for doing same.

However, other modifications, variations and alternatives are also possible. The specifications and drawings are, accordingly, to be regarded in an illustrative rather than in a restrictive sense. Thus, for example, whilst the present application has been described in the context of a non isolated boost PFC topology it may readily be extended to other topologies such as for example a Flyback topology which may or may not be isolated.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A power factor correction circuit for a power supply, the power factor correction circuit accepting an AC input and providing a DC output, the power factor correction circuit comprising:
   a first inductor coupled to receive the AC input,
   a first capacitor,
   a first switch connected between a first AC node and a second AC node,
   a transformer having a first winding and a second winding and a saturable core which saturates under normal current operating conditions,
   a rectifying bridge, wherein the second winding of the transformer and the first inductor are connected in series between the AC input and the rectifying bridge and wherein the first inductor, first capacitor, first switch and rectifying bridge are arranged in a boost switching topology where the first switch is employed in transferring energy from the input to the output using the first inductor and first capacitor, and
   a passive snubber connected on a first end to the first node of the first switch and connected on a second end to the second node of the first switch, the snubber including the first winding of the transformer, wherein the first node of the first switch is connected to the rectifying bridge.

2. The power factor correction circuit according to claim 1, wherein the passive snubber comprises a second capacitor in series with the first winding.

3. The power factor correction circuit according to claim 1, wherein the passive snubber is connected at the second end to another node of the rectifying bridge.

4. The power factor correction circuit according to claim 1, wherein the rectifying bridge comprises four diodes.

5. The power factor correction circuit according to claim 1, wherein the rectifying bridge comprises two switches and two diodes.

6. The power factor correction circuit according to claim 5, wherein one of the switches of the rectifying bridge is the first switch.

7. The power factor correction circuit according to claim 1, further comprising a controller for controlling the first switch, wherein the controller is configured to control the first switch to ensure the operation of the power factor correction circuit in continuous mode.

8. The power factor correction circuit according to claim 7, wherein the controller is configured to detect when the power factor correction circuit is not able to operate in continuous mode and upon detecting such a condition limits switching of the first switch for one or more intervals.

9. The power factor correction circuit according to claim 8, wherein each of the one or more intervals comprises a full mains cycle.

10. The power factor correction circuit according to claim 9, wherein each of the one or more intervals are during a half mains cycle such that the controller operates in a burst mode.

11. The power factor correction circuit according to claim 8, wherein each of the one or more intervals comprises a period at a start and an end of each half mains cycle.

12. The power factor correction circuit according to claim 1, further comprising a controller for controlling the first switch, wherein the controller is configured to control the first switch to operate the power factor correction circuit using zero-voltage switching conditions.

13. A power factor correction circuit for converting an AC input voltage to a DC output voltage, the power factor correction circuit comprising:
   first and second AC input nodes for receiving the AC input voltage;
   first and second DC output nodes providing the DC output voltage;
   a switching circuit arranged in a boost switching topology, wherein the switching circuit includes:
      a first inductor coupled to receive the AC input voltage,
      a rectifying bridge having a first input node, a second input node, and two output nodes, wherein the second input node is electrically connected to the second AC input node,
      a transformer having a first winding, a second winding and a saturable core that saturates under normal current operating conditions, wherein the first inductor and the second winding of the transformer are connected in series between the first AC input node and the first input node of the rectifying bridge,
      a first semiconductor switch for switchably connecting the first input node of the rectifying bridge to the second AC input node,
      a first capacitor connected between the two output nodes of the rectifying bridge, and
      a passive snubber connected across the first and second input nodes of the rectifying bridge, wherein the passive snubber includes the first winding of the transformer.

14. The power factor correction circuit according to claim 13, further comprising a controller for controlling the first semiconductor switch, wherein the controller is configured to control the first semiconductor switch to ensure the operation of the power factor correction circuit in continuous mode.

15. The power factor correction circuit according to claim 14, wherein the controller is configured to detect when the power factor correction circuit is not able to operate in continuous mode and, upon detecting such a condition, limits switching of the first semiconductor switch for one or more intervals.

16. The power factor correction circuit according to claim 13, further comprising a controller for controlling the first semiconductor switch, wherein the controller is configured to control the first semiconductor switch to operate the power factor correction circuit using zero voltage switching conditions.

17. A power factor correction circuit for accepting an AC input voltage across first and second AC input nodes and providing a DC output across first and second DC output nodes, the power factor correction circuit comprising:
   a switching circuit arranged in a boost switching topology, wherein the switching circuit includes:
      a first inductor coupled to receive the AC input voltage,
      a transformer having a primary and secondary winding, where the secondary winding is electrically connected in series with the first inductor between the first AC input node and a switched node, the transformer having a saturable core that saturates under normal operating conditions,
      a first semiconductor switch for switchably connecting the switched node to the first DC output node,
      a second semiconductor switch for switchably connecting the switched node to the second DC output node,
      first and second rectifiers connected in series between the first and second DC output nodes and sharing a common intermediate node, wherein the common intermediate node is connected to the second AC input node;
      a first capacitor connected between the first and second DC output nodes; and
      a second capacitor connected in series with the primary winding between the common intermediate node and the switched node.

18. The power factor correction circuit according to claim 17, further comprising a controller for controlling the operation of the first and second semiconductor switches, wherein the controller is configured to control the first and second semiconductor switches to ensure the operation of the power factor correction circuit in continuous mode.

19. The power factor correction circuit according to claim 18, wherein the controller is configured to detect when the power factor correction circuit is not able to operate in continuous mode and upon detecting such a condition limits switching of the first and second semiconductor switches for one or more intervals.

20. The power factor correction circuit according to claim 17, further comprising a controller for controlling the operation of the first and second semiconductor switches, wherein the controller is configured to control the first and second semiconductor switches to maintain operation of the power factor correction circuit using zero voltage switching conditions.

* * * * *